O. McNEIL & P. W. DALTON.
Apparatus for Scraping Hogs.

No. 140,838.

Patented July 15, 1873.

Witnesses:
A Bennecrendorf
Alex F. Roberts

Inventor:
O. McNeill
P. W. Dalton
Per Munn & Co.
Attorneys.

UNITED STATES PATENT OFFICE.

ORISON McNEIL AND PETER W. DALTON, OF JERSEY CITY, NEW JERSEY.

IMPROVEMENT IN APPARATUS FOR SCRAPING HOGS.

Specification forming part of Letters Patent No. 140,838, dated July 15, 1873; application filed March 1, 1873.

*To all whom it may concern:*

Be it known that we, ORISON McNEIL and PETER W. DALTON, of Jersey City, in the county of Hudson and State of New Jersey, have invented a new and Improved Method of Scraping and Shaving Hogs, of which the following is a specification:

Our invention consists in an arrangement of carrying-rollers with scraping-blades and a chain, the last being used for drawing the hogs over the rollers and between the blades, as hereinafter described.

Figure 1:
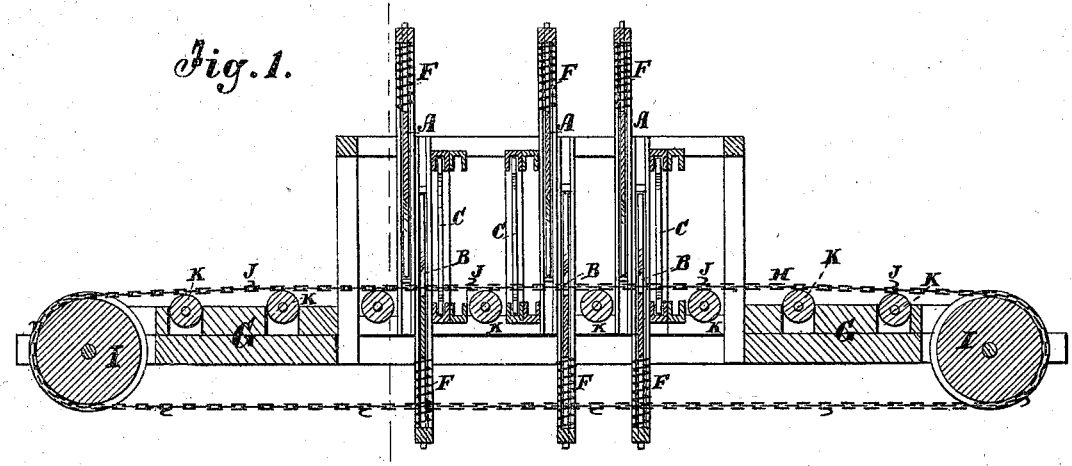
Figure 2:
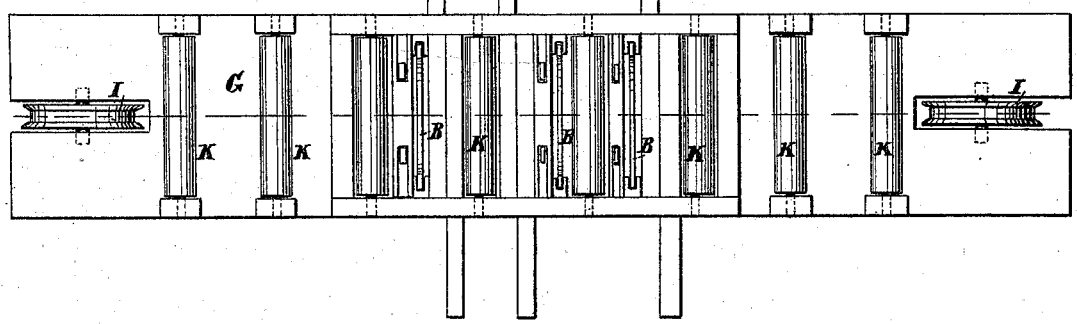
Figure 3:
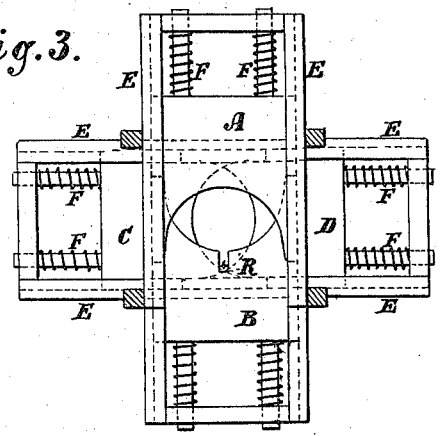

Figure 1 is a longitudinal sectional elevation of a machine such as we propose to use, the section being taken on the line $xx$ of Fig. 2, which is a plan view; and Fig. 3 is a transverse sectional elevation.

Similar letters of reference indicate corresponding parts.

A and B represent vertically-yielding scraping and shaving blades with concave edges, the latter, B, being notched to allow the endless chain to pass through them. C and D represent horizontally-yielding blades with similar edges S, and, like the blades A B, are arranged in ways E on any suitable frame to slide toward and from a common center, all of the blades being provided with springs F for pressing them toward the said center, which is in a line about as much higher than the table G as half the diameter of a medium-sized hog. H is an endless chain running forward between the cutting-edges of these blades, and backward under them and the table over the grooved rollers I at each end of the table, which will have suitable power applied for moving the chain. J represents hooks on the chain at suitable intervals, for catching a hog by one of the jaws and drawing it between the blades to be scraped. K represents carrier-rollers arranged in the surface of the table at suitable intervals, and between the scraping-blades, for carrying the carcasses along more easily than they would be dragged along the table, and supporting and carrying them between the blades. The chain may have continuous or intermittent motion, as will be found best.

The carcasses will be drawn out of the scalding-kettles, hooked on the chain, drawn between the blades, and then unhooked, and thus be rapidly and efficiently scraped, shaved, and cleaned of all bristles, hairs, and other matters on the surface.

Some of the blades, particularly those on the entering side of the machine, will have their edges more particularly adapted for scraping off the hairs and bristles mainly, being less sharp than those on the other side, which will be sharper for shaving off the hairs and bristles which do not pull out freely.

It will be seen, by inspection of Fig. 3, that with two sets of blades moving at right angles to each other, and having their edges properly shaped in respect of the size of the curves, the carcass will be effectually scraped in all parts of the circumference.

Having thus described our invention, we claim as new and desire to secure by Letters Patent—

The combination of the carrying-rollers K with the notched blades and the hooked chain, substantially as specified.

ORISON McNEIL.
      PETER W. DALTON.

Witnesses:
 A. P. THAYER,
 T. B. MOSHER.